Jan. 2, 1934.  C. BROWN  1,942,237
FASTENING MEANS FOR EXPANSIBLE BODIES
Filed Jan. 14, 1931  2 Sheets-Sheet 1

INVENTOR
CARLETON BROWN
BY J.D.O'Connell
ATTORNEY

Jan. 2, 1934.  C. BROWN  1,942,237
FASTENING MEANS FOR EXPANSIBLE BODIES
Filed Jan. 14, 1931  2 Sheets-Sheet 2

INVENTOR
CARLETON BROWN
BY J. D. O'Connell
ATTORNEY

Patented Jan. 2, 1934

1,942,237

UNITED STATES PATENT OFFICE

1,942,237

FASTENING MEANS FOR EXPANSIBLE BODIES

Carleton Brown, Westmount, Quebec, Canada

Application January 14, 1931. Serial No. 508,727

16 Claims. (Cl. 296—26)

This invention relates to expansible bodies and has particular reference to a body construction adapted to be mounted on a vehicle chassis; or on the deck or other part of a boat; or to be used in other relations where an expansible body or cabin may be employed to advantage. More particularly, the invention is directed to expansible bodies of the general character disclosed in my co-pending application Serial No. 379,794, filed July 20, 1929.

In my said co-pending application, I have disclosed an expansible body construction including a permanent floor upon which is mounted a pair of laterally separable body sections. The permanent floor is represented as being carried by the chassis of a vehicle and each body section is shown as provided with its own floor, end walls, and outer side wall. In the contracted state of the body, the sections are arranged to abut in a plane coinciding with the longitudinal axis of the permanent floor or chassis. For expansion purposes, the body sections are separated laterally so that the floor portions of these sections project outwardly an appreciable distance beyond the opposite longitudinal edges of the permanent floor and suitable means are provided for supporting said sections in their separated position. The construction is such that, in the contracted state, the complete body is formed solely by the abutting sections as the permanent floor and the chassis are then utilized only as a supporting foundation. When the body is in its expanded state the permanent floor serves to bridge the gap between the floor portions of the separated body sections but, aside from this, the walls of the expanded body are formed solely by the body sections and by certain roof and end closure elements which may be associated with and supported by said body sections independently of the permanent floor or chassis.

In addition to the foregoing construction, the present invention comprises a separately formed roof adapted to close the top of the body and to be supported on the body sections when the latter are brought together to contract the body. The roof and the upper edges of the body sections are formed with interengaging portions which serve to resist separation of the sections in the contracted state of the body. Upper and lower fastening devices are also provided to establish direct tie connections between the abutting body sections. The upper fastening device includes provision for anchoring the roof in interfitting engagement with the body sections while the lower fastening device includes provision for anchoring the body sections to the underlying supporting structure. A feature of the invention is that the upper and lower fastening devices are substantial duplicates with the exception of a slight reversal of position. The advantage of this is that it facilitates economical mass production of the fastening devices in actual commercial practice.

Proceeding now to a more detailed discussion of the invention, reference will be had to the accompanying drawings.

In these drawings the body sections 11 and 12 are shown mounted on a permanent floor 13 carried by a frame 14. In the present instance frame 14 represents the chassis of a vehicle in accordance with the disclosure of my prior application. The permanent floor 13 may, however, be mounted upon a stationary frame or upon any other suitable foundation; or it may be arranged on or constructed to form part of the deck or other floor of a boat, in the event that the expansible body is to be utilized as a boat cabin.

Figure 1:
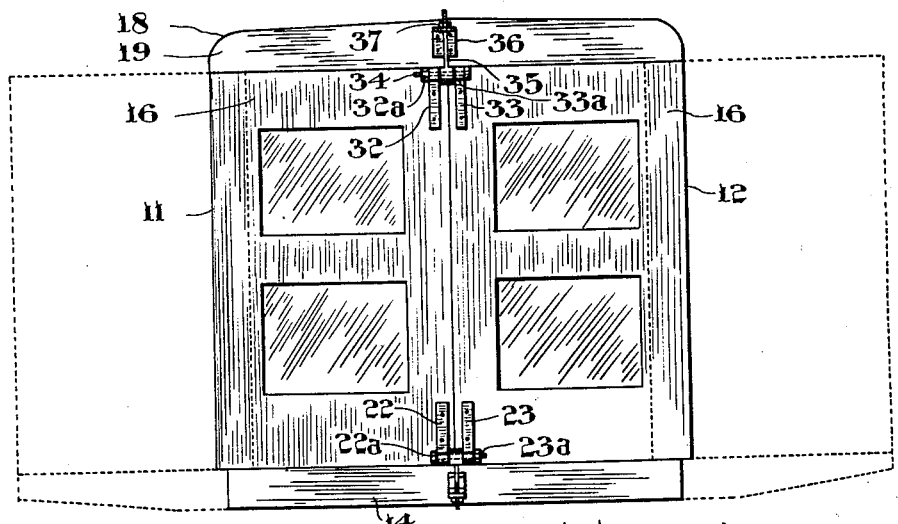
Figure 1 is an end view showing the manner in which the parts are secured together when the body is in the contracted state. In this view the position to which the body sections are separated for expansion purposes is indicated by dotted lines.

Each of the body sections 11 and 12 is equipped with a floor 15, end walls 16, and an outer side wall 17. In the contracted state of the body, the sections 11 and 12 meet in abutting relation in a plane coinciding with the longitudinal center of the frame 14, as indicated by full lines in Fig. 1. In this position of the body sections, the top of the body is fully closed by a roof member 18 provided with a depending and continuous marginal flange 19. The upper edges of the body sections 11 and 12 are shaped to present vertical flanges 20 and horizontal shoulders 21, the latter being located outwardly of and at the base of said flanges. When the parts are arranged as shown in Fig. 1, the roof flange 19 telescopes the flange 20 and rests upon the shoulder 21. The telescopic connection thus provided between the roof and the abutting body sections forms a weatherproof joint and serves to assist in resisting lateral separation of the body sections.

Figure 2:
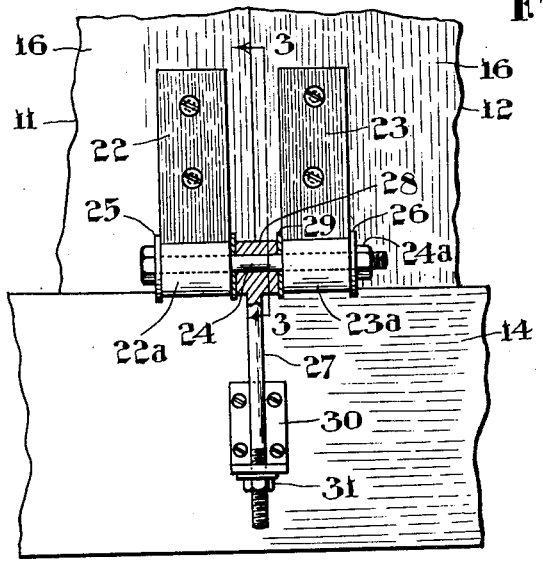
Figure 2 is a fragmentary view partly in elevation and partly in section of the fastening means employed at each end of the body for securing the body sections together and to the underlying supporting structure.
Figure 3:
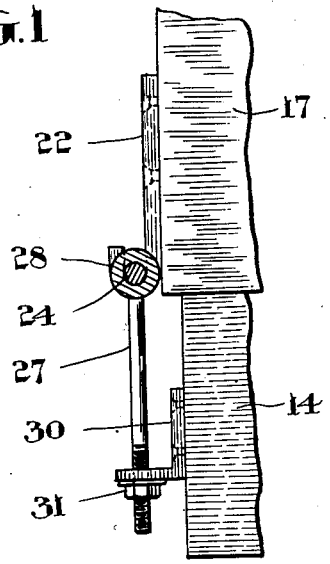
Figure 3 is a sectional view taken on the line 3—3 of Fig. 2.
Figure 4:
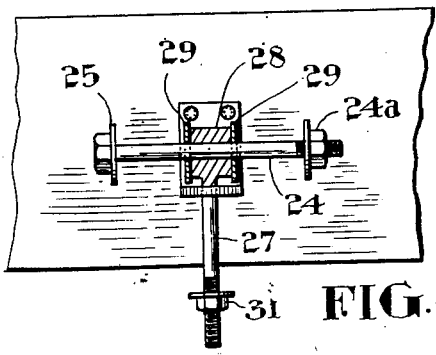
Figure 4 is a view showing the manner in which certain elements of the fastening means may be carried by the supporting structure when the body sections are in expanded relation.

When the body sections are brought together to contract the body, it is desirable that the inner lower corner portions of these sections be securely tied together and anchored to the underlying end members of the supporting frame 14. This is accomplished by attaching metal straps 22 and 23 to the wall 16 at each end of the body sections. The lower ends of these straps are curved upwardly to form hooks 22a and 23a. In the abutting relation of the body sections the hook 22a of section 11 lies close to the hook 23a of section 12 and these two hooks are fastened together by a horizontal bolt 24 arranged as more clearly shown in Figs. 2 and 3. This bolt carries a pair of washers 25 and 26 bearing against the outer sides of the hooks 22a and 23a. A vertically disposed eye bolt 27 is suspended from the central portion of the bolt 24 and has its eye 28 spaced from the hooks 22a and 23a by means of the interposed washers 29. The shank of the bolt 27 passes downwardly through a bracket 30 fastened to the frame 14 and is equipped with a nut 31 engaging with the underside of said bracket.

From the foregoing it will be readily seen that when the body sections 11 and 12 are brought together to contract the body, the lower corner portions of these sections may be quickly and securely tied together by placing the bolt 24 in the hooks 22a and 23a and then tightening the nut 24a. The eye bolt 28 is then tightened by means of the nut 31 so that the body sections 11 and 12 are firmly anchored to the supporting frame 14.

Similar means are employed for tightening together the upper inner corner portions of the body sections and anchoring the roof member thereto. Such means comprise a pair of straps 32 and 33 having their upper ends bent outwardly and downwardly to form hooks 32a and 33a adapted to be engaged by a horizontal bolt 34 corresponding to the bolt 24 previously described. Attached to the bolt 34 is an eye bolt 35 which corresponds to the bolt 27 previously described. The shank of the bolt 35 passes upwardly through a bracket 36 fastened to the roof 18 and is equipped with a nut 37 engaging the upper side of said bracket. By engaging the bolt 34 with the hooks 32a and 33a and then tightening the nut 37, it will be seen that the roof and the upper corner portions of the body sections are firmly and securely tied together.

Figure 5:
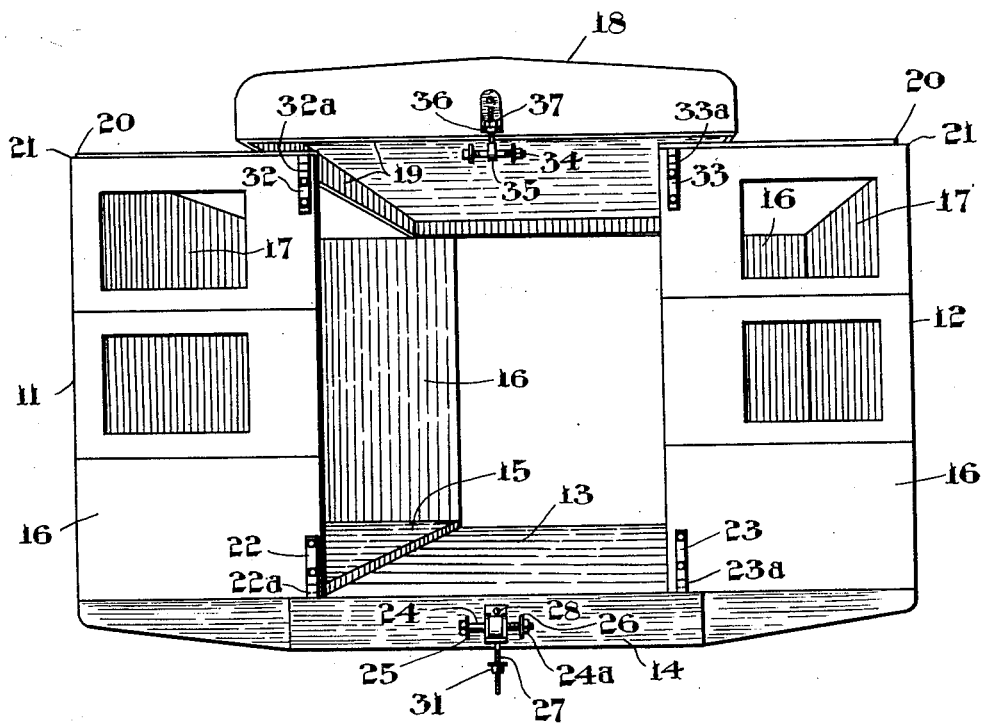
Figure 5 is a perspective view showing the position occupied by the body sections when the body is in the expanded state.
Figure 6:
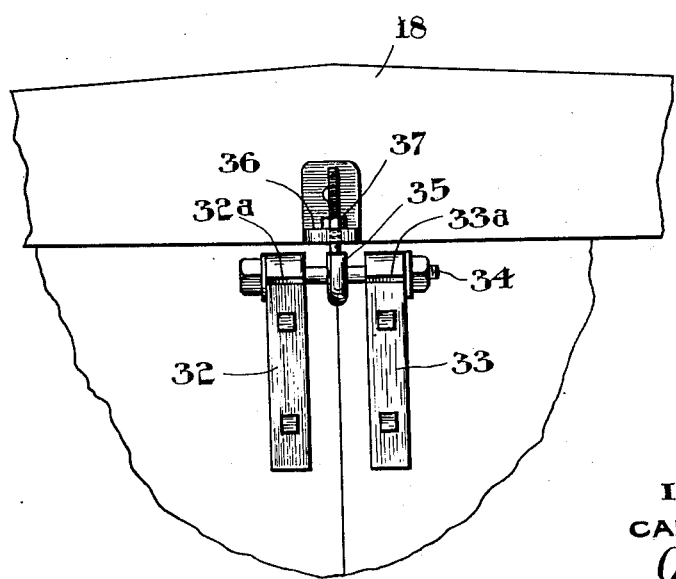
Figure 6 is a fragmentary end view showing the arrangement of the fastening means employed for securing the roof member to the body sections.

When the body sections 11 and 12 are to be released and separated to the positions indicated by dotted lines in Fig. 1 and by full lines in Fig. 5, this is easily accomplished in the following manner. The nuts carried by the horizontal bolts 24 and 34 are first loosened to relieve the clamping pressure on the hooks associated with said bolts. The nuts 31 and 37 are next loosened to permit the bolts 24 and 34 to be released from engagement with said hooks. The roof member 18 is then raised clear of the flanges 20 and the body sections 11 and 12 separated to their body expanding positions. It may be explained here that, in the separated position of the body sections, the gaps left between the roof member and the upper edges of the body sections may be closed in any suitable manner. It is also contemplated that the roof member shall be capable of vertical adjustment with reference to the body sections to afford increased headroom when the body is in the expanded state. These last mentioned features, however, constitute the subject matter of a separate invention and disclosure thereof is not deemed necessary to an understanding of the present improvements.

Having thus fully described what I now conceive to be the preferred embodiment of my invention, it will be understood that various modifications may be resorted to within the scope and spirit of the appended claims.

Having thus described my invention, what I claim is:—

1. An expansible body comprising laterally separable body sections and a separately formed roof member adapted to close the top of the body and to be wholly supported by the body sections when the latter are brought together in the contracted state of the body, said roof member having edge portions normally fitting over the upper edges of the end and outer side walls of said body sections and being vertically displaceable to a position freeing the said body sections for lateral separation.

2. An expansible body comprising laterally separable body sections, a separately formed roof adapted to completely close the top of the body and to be wholly supported on said sections when the latter are brought together to contract the body, said roof having edge portions normally fitting over the upper edges of the end and outer side walls of said body sections to resist separation thereof in the contracted state of the body and being capable of vertical displacement to free the body sections for lateral separation when it is desired to expand the body and means for anchoring the roof member to the end walls of both body sections in the contracted state of the body.

3. An expansible body comprising laterally separable body sections adapted to be butted together in the contracted condition of the body, a separately formed roof adapted to close the top of the body, and to be wholly supported by the body sections when the latter are brought together to contract the body, said roof having edge portions normally fitting over the upper edges of the end and outer side walls of said sections in the contracted condition of the body and being capable of vertical displacement to a position freeing said sections for lateral separation and means for fastening the body sections to one another in the contracted state of the body, said means including provision for anchoring the roof to said body sections.

4. An expansible body comprising laterally separable body sections, each section having its own floor, end walls and outer side wall and being open at the top, a displaceable roof formed for telescopic engagement with the end and outer side walls of both of said sections to resist separation thereof when the sections are butted together in the contracted state of the body and fastening means for tying the sections together in the contracted state of the body including provision for anchoring the roof in telescopic engagement with said sections.

5. An expansible body comprising a pair of complementary body sections normally arranged in abutting relation to provide a contracted body and capable of lateral separation to provide an expanded body, a separately formed roof adapted to completely close the top of the body and to be wholly supported by said sections when the latter are brought together to contract the body, means for connecting together the end walls of said sections to resist separation thereof in the contracted state of the body and means for fastening the roof to the connected body sections.

6. An expansible body comprising a support, separable body sections arranged thereon, each section having its own floor, end walls and outer side wall and fastening means for establishing a direct tie connection between the end walls of said sections when the latter are brought together to contract the body, said means including provision for anchoring the sections to said support.

7. An expansible body comprising a support, separable body sections arranged thereon, each section having its own floor, end walls and outer side wall and being open at the top, a separately formed, vertically displaceable roof adapted to close the top of the body and to be wholly supported by said sections when the latter are brought together to contract the body, fastening means for directly connecting the sections to resist separation thereof in the contracted state of the body, means for anchoring the roof to the connected sections and means for anchoring the connected sections to said support.

8. An expansible body comprising a support, separable body sections arranged thereon, each section having its own floor, end walls and outer side wall and being open at the top, a separately formed roof adapted to close the top of the body and to be supported on said sections when the latter are brought together to contract the body, said sections and roof being provided with interengageable portions resisting separation of the sections in the contracted state of the body, and means for tying together said body sections, roof and support in the contracted state of the body.

9. An expansible body construction comprising a support, laterally separable body sections arranged thereon, a roof member for closing the upper portions of the sections in the contracted state of the body, said roof member being supported solely by said sections, means for anchoring the roof member to said sections, and means for anchoring said sections to said support.

10. An expansible body construction comprising laterally separable body sections, each section having its own floor, end walls and outer side wall and being open at the top, a roof member, and means for releasably securing said roof member to both of said sections in a position closing the top of the body when the later is in the contracted state, said roof member being supported solely by said body sections in the contracted state of the body.

11. An expansible body construction comprising a support, laterally separable body sections normally arranged in abutting relation on said support, each section having its own floor, end walls and outer side wall and being open at the top, a roof member normally supported by and closing the upper portions of the abutting sections, and releasable upper and lower fastening means adapted to be arranged to form direct tie connections between the end walls of said sections to secure same in abutting relation, said upper fastening means including provision for anchoring the roof in place and said lower fastening means including provision for anchoring the sections to said support.

12. An expansible body construction comprising a support, laterally separable body sections normally arranged in abutting relation on said support, each section having its own floor, end walls and outer side wall and being open at the top, a roof member normally supported on and closing the upper portions of said sections, and upper and lower fastening means adapted to be arranged to form direct tie connections between the sections to releasably secure the sections in abutting relation, said lower fastening means including provision for releasably anchoring the sections to said support.

13. An expansible body construction comprising a support, separable body sections normally arranged in abutting relation on said support, each section having its own floor, end walls and outer side wall and being open at the top, hook members carried by the end walls of said sections, bolts engageable with said hook members to resist separation of the sections and connections between the bolts and the support serving to anchor the sections to said support.

14. An expansible body construction comprising a support, laterally separable body sections normally arranged in abutting relation on said support, each section having its own floor, end walls and outer side wall and being open at the top, members carried by the end walls of said sections, connectors engageable with said members to resist separation of the sections and means anchoring the connectors to said support.

15. An expansible body construction comprising a support, separable body sections normally arranged in abutting relation on said support, each section having its own floor, end walls and outer side wall and being open at the top, a roof member for closing the upper portions of the body sections in the contracted state of the body, said roof member being supported solely by the upper edge portions of said sections, upper and lower hooks carried by the body sections at each end, upper and lower bolts engageable with said hooks to resist separation of the body sections when said sections are brought together to contract the body, connections between the upper portions and the roof serving to anchor the roof in place on the body sections and connections between the lower portions and the support serving to anchor the body sections to said support.

16. An expansible body construction comprising a support, laterally separable body sections arranged thereon, each section having its own floor, end walls and outer side wall and being open at the top, a roof member for closing the upper portions of the sections in the contracted state of the body, said roof member being supported entirely by the upper edges of said sections, upper and lower plates carried by the opposite ends of each body section, the upper plates having their upper terminals curving outwardly and downwardly to provide downwardly opening hooks and the lower plates having their lower terminals curving outwardly and upwardly to provide opening hooks, upper and lower hooks adapted to be engaged beneath the hook portions of said plates and to co-operate therewith for resisting separation of the body sections when the latter are brought together to contract the body, adjustable means connecting the lower bolts to said support and adjustable means connecting the upper bolts to said roof member.

CARLETON BROWN.